(12) United States Patent
Freeman et al.

(10) Patent No.: US 9,156,552 B2
(45) Date of Patent: Oct. 13, 2015

(54) APPARATUS FOR USE ON UNMANNED VEHICLES

(75) Inventors: Isobel Louise Freeman, Lytham (GB); Keith Antony Rigby, Preston (GB)

(73) Assignee: BAE SYSTEMS PLC, London (GB)

( * ) Notice: Subject to any disclaimer, the term of this patent is extended or adjusted under 35 U.S.C. 154(b) by 69 days.

(21) Appl. No.: 14/129,195

(22) PCT Filed: Jun. 20, 2012

(86) PCT No.: PCT/GB2012/051416
§ 371 (c)(1), (2), (4) Date: Dec. 24, 2013

(87) PCT Pub. No.: WO2012/175953
PCT Pub. Date: Dec. 27, 2012

(65) Prior Publication Data
US 2014/0222249 A1     Aug. 7, 2014

(30) Foreign Application Priority Data

Jun. 24, 2011 (GB) .................................. 1110820.6

(51) Int. Cl.
| | |
|---|---|
| G05D 1/00 | (2006.01) |
| B64C 39/02 | (2006.01) |
| F41H 7/00 | (2006.01) |
| F41H 13/00 | (2006.01) |
| F42B 12/36 | (2006.01) |

(52) U.S. Cl.
CPC .............. *B64C 39/024* (2013.01); *F41H 7/005* (2013.01); *F41H 13/00* (2013.01); *F42B 12/365* (2013.01); *B64C 2201/00* (2013.01); *B64C 2201/121* (2013.01); *B64C 2201/123* (2013.01); *B64C 2201/127* (2013.01)

(58) Field of Classification Search
None
See application file for complete search history.

(56) References Cited

U.S. PATENT DOCUMENTS

| | | | | |
|---|---|---|---|---|
| 4,471,683 A | * | 9/1984 | Brown | ........................... 89/1.11 |
| 4,614,050 A | * | 9/1986 | Stevens | ......................... 42/1.01 |
| 5,612,503 A | * | 3/1997 | Sepp | .............................. 89/1.11 |

(Continued)

FOREIGN PATENT DOCUMENTS

| | | |
|---|---|---|
| EP | 1956451 A1 | 8/2008 |
| EP | 2 151 729 A1 | 2/2010 |

(Continued)

OTHER PUBLICATIONS

Merriam-Webster Collegiate Dictionary, 10*th* Edition, 1993, all pages.*

(Continued)

*Primary Examiner* — Calvin Cheung
(74) *Attorney, Agent, or Firm* — Maine Cernota & Rardin

(57) ABSTRACT

An apparatus, and a method performed by the apparatus, are disclosed wherein the apparatus can be mounted on an unmanned vehicle and arranged to act upon a payload. The payload can be mounted on the unmanned vehicle and, under an action of the apparatus, is able to be activated. The method can include receiving an activation instruction from an entity remote from the unmanned vehicle; determining whether or not the received activation instruction is valid by performing a validation process; and in response to determining that the received activation instruction is valid, activating the payload. In response to determining that the received activation instruction is not valid, activation of the payload may be prevented or opposed.

21 Claims, 3 Drawing Sheets

(56) References Cited

U.S. PATENT DOCUMENTS

| | | | |
|---|---|---|---|
| 5,686,690 A * | 11/1997 | Lougheed et al. | 89/41.17 |
| 6,122,572 A | 9/2000 | Yavnai | |
| 6,260,797 B1 * | 7/2001 | Palmer | 244/49 |
| 6,359,681 B1 * | 3/2002 | Housand et al. | 356/4.01 |
| 6,853,328 B1 * | 2/2005 | Guice et al. | 342/54 |
| 6,873,886 B1 | 3/2005 | Mullen et al. | |
| 6,952,001 B2 * | 10/2005 | McKendree et al. | 244/3.1 |
| 7,478,578 B2 * | 1/2009 | Kirkpatrick | 89/1.11 |
| 7,478,817 B1 * | 1/2009 | Carrier | 180/6.48 |
| 7,509,212 B2 * | 3/2009 | Bodin et al. | 701/528 |
| 7,620,181 B2 * | 11/2009 | Bicksler et al. | 380/221 |
| 8,140,215 B2 * | 3/2012 | Paquette et al. | 701/33.4 |
| 8,178,825 B2 * | 5/2012 | Goossen et al. | 244/3.14 |
| 8,366,054 B2 * | 2/2013 | Miller et al. | 244/175 |
| 8,400,619 B1 * | 3/2013 | Bachrach et al. | 356/4.01 |
| 2003/0089219 A1 * | 5/2003 | Gorman | 89/1.11 |
| 2003/0102403 A1 * | 6/2003 | Jones et al. | 244/3.13 |
| 2003/0152892 A1 * | 8/2003 | Huang et al. | 434/11 |
| 2003/0210185 A1 * | 11/2003 | Hager et al. | 342/194 |
| 2004/0068416 A1 * | 4/2004 | Solomon | 705/1 |
| 2004/0219491 A1 * | 11/2004 | Shlomo | 434/11 |
| 2005/0004759 A1 * | 1/2005 | Siegel | 701/223 |
| 2005/0204910 A1 * | 9/2005 | Padan | 89/1.813 |
| 2006/0197835 A1 * | 9/2006 | Anderson et al. | 348/117 |
| 2007/0157843 A1 * | 7/2007 | Roemerman et al. | 102/385 |
| 2007/0235584 A1 * | 10/2007 | Corman et al. | 244/75.1 |
| 2007/0297416 A1 * | 12/2007 | Boley et al. | 370/395.21 |
| 2008/0001064 A1 * | 1/2008 | Thomas et al. | 250/206.1 |
| 2008/0065401 A1 | 3/2008 | Abrahamson | |
| 2008/0121097 A1 | 5/2008 | Rudakevych et al. | |
| 2008/0136916 A1 * | 6/2008 | Wolff | 348/169 |
| 2009/0000465 A1 * | 1/2009 | Deflumere et al. | 89/1.11 |
| 2009/0107386 A1 * | 4/2009 | Sampson et al. | 114/261 |
| 2009/0126556 A1 * | 5/2009 | Skurdal et al. | 89/1.817 |
| 2009/0134273 A1 * | 5/2009 | Page et al. | 244/63 |
| 2009/0157236 A1 * | 6/2009 | Van Gaasbeck et al. | 701/3 |
| 2009/0200995 A1 * | 8/2009 | Tran et al. | 323/222 |
| 2009/0241763 A1 * | 10/2009 | Revord | 89/1.11 |
| 2009/0268753 A1 * | 10/2009 | Lail | 370/466 |
| 2009/0306840 A1 * | 12/2009 | Blenkhorn et al. | 701/16 |
| 2009/0320585 A1 * | 12/2009 | Cohen | 73/167 |
| 2009/0323047 A1 * | 12/2009 | Karazi et al. | 356/4.01 |
| 2010/0082183 A1 | 4/2010 | Lassini et al. | |
| 2010/0194641 A1 * | 8/2010 | Miller | 342/417 |
| 2010/0198514 A1 * | 8/2010 | Miralles | 701/302 |
| 2010/0250022 A1 * | 9/2010 | Hines et al. | 701/2 |
| 2010/0274487 A1 * | 10/2010 | Neff et al. | 701/302 |
| 2011/0144828 A1 | 6/2011 | Chengalva | |
| 2011/0172850 A1 * | 7/2011 | Paz-Meidan et al. | 701/2 |
| 2011/0202203 A1 | 8/2011 | Johansson | |
| 2011/0234796 A1 * | 9/2011 | Taber | 348/144 |
| 2011/0289810 A1 * | 12/2011 | D'Souza et al. | 42/1.01 |
| 2012/0019522 A1 * | 1/2012 | Lawrence et al. | 345/419 |
| 2012/0055321 A1 * | 3/2012 | Angeloff | 89/1.51 |
| 2012/0232717 A1 * | 9/2012 | Koppie | 701/2 |
| 2012/0234966 A1 * | 9/2012 | Biswell | 244/3.16 |
| 2013/0304282 A1 * | 11/2013 | Beggs et al. | 701/3 |
| 2014/0109458 A1 * | 4/2014 | Maryfield et al. | 42/119 |

FOREIGN PATENT DOCUMENTS

| | | |
|---|---|---|
| EP | 2 317 412 A1 | 5/2011 |
| EP | 2 333 479 A2 | 6/2011 |

OTHER PUBLICATIONS

International Search Report (PCT/ISA/210) mailed on Oct. 22, 2012, by the European Patent Office as the International Searching Authority for International Application No. PCT/GB2012/051416.

Search Report, dated Dec. 13, 2011, by the United Kingdom Patent Office as the Searching Authority for GB 1110820.6.

Salgar, Sushant, et al., Modeling and Simulation of the Thin Film Bulk Acoustic Resonator, 2002 IEEE International Frequency Control Symposium and PDA Exhibition, pp. 40-44.

* cited by examiner

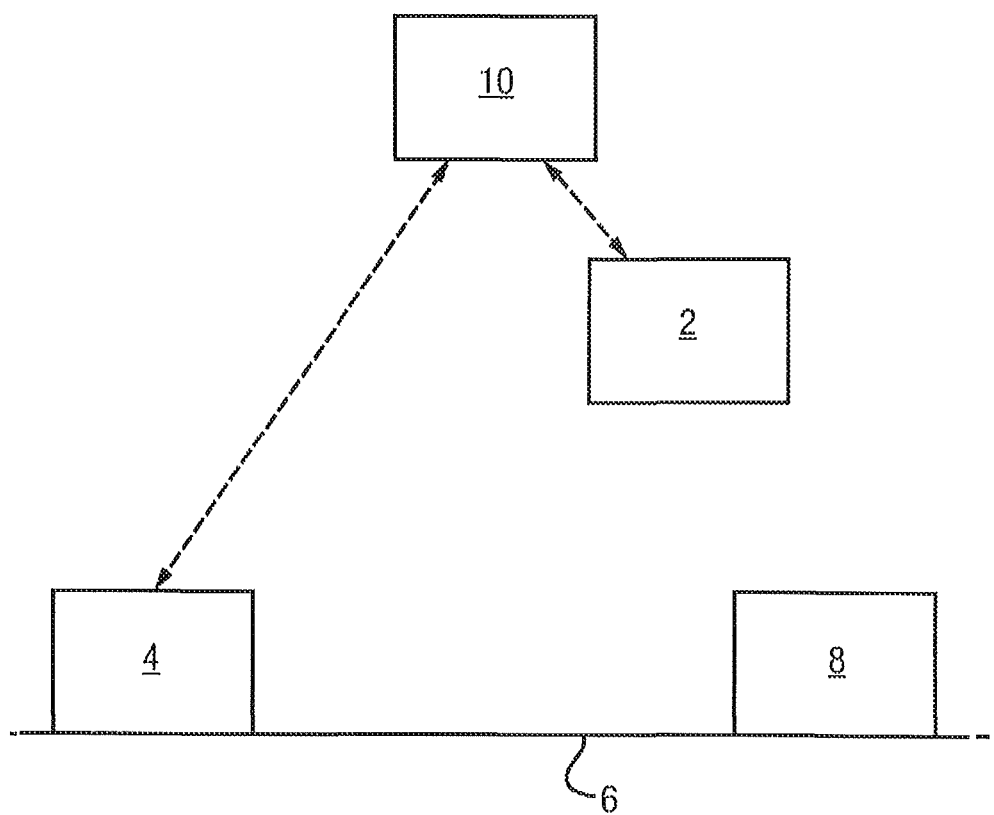

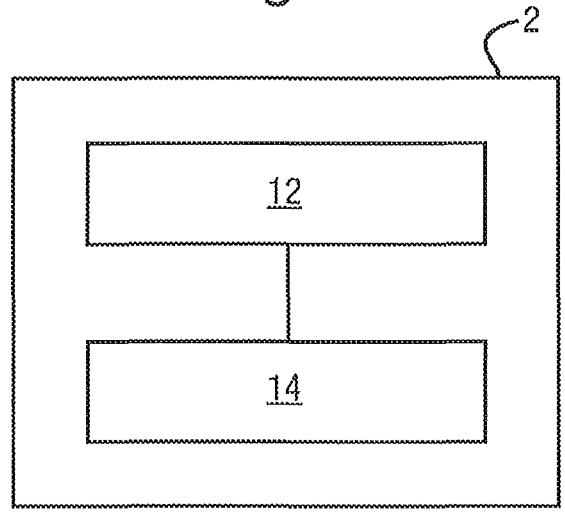
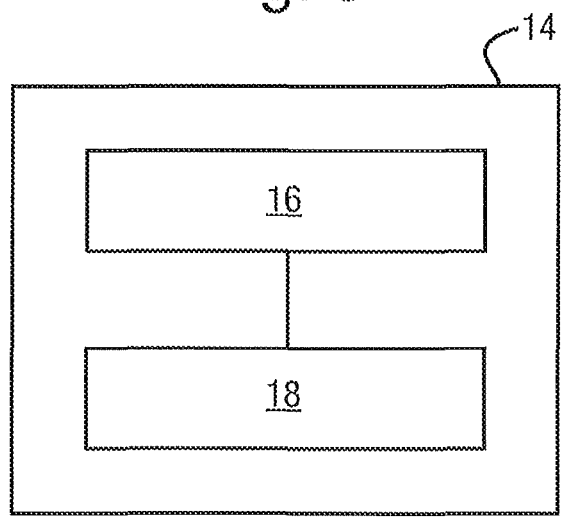

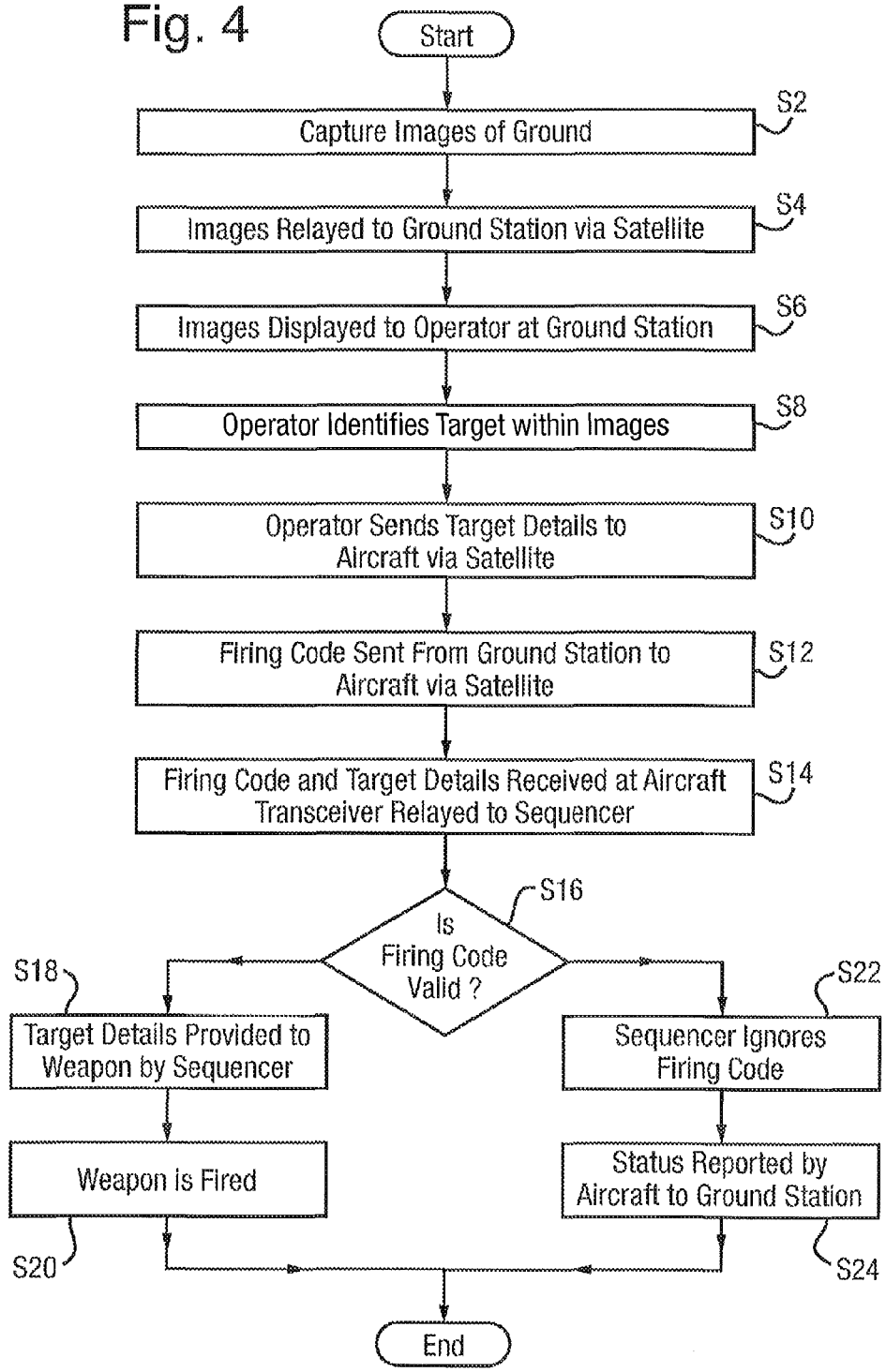

APPARATUS FOR USE ON UNMANNED VEHICLES

FIELD OF THE INVENTION

The present invention relates to apparatus for use on unmanned vehicles.

BACKGROUND

Unmanned aircraft are powered aerial vehicles that do not carry a human operator. They may fly autonomously or be piloted remotely.

A data link employed to facilitate communication between an unmanned aircraft and its operator, e.g. a satellite data-link, may have uncertain performance, availability, and integrity.

In manned armed aircraft, the weapon control is typically performed by the airborne operator. The airborne operator interprets relevant Rules of Engagement to ensure weapons release is authorised. Typically, the weapon is released using a control sequence to release a series of electro-mechanical safety critical switches. The control sequence is usually performed on the aircraft. The data-link employed within a manned aircraft for the control of the weapon systems is typically robust, reliable, and of high integrity relative to a data link used for communication between an unmanned aircraft and its operator.

SUMMARY OF THE INVENTION

In a first aspect, the present invention provides a method performed by apparatus, the apparatus being mounted on an unmanned vehicle and arranged to act upon a payload, the payload being mounted on the unmanned vehicle and, under an action of the apparatus, able to be activated, the method comprising receiving an activation instruction from an entity, the entity being remote from the unmanned vehicle, determining whether or not the received activation instruction is valid by performing a validation process, and in response to determining that the received activation instruction is valid, activating the payload.

The method may further comprise, in response to determining that the received activation instruction is not valid, preventing or opposing the activation of the payload.

The apparatus may comprise, or has access to, validation information, and the validation process may comprise comparing the received activation instruction to the validation information.

The activation instruction may comprise a code, and the validation information may be a further code, the further code being stored in the apparatus.

The activation instruction may comprise an indication of a time that the activation instruction was sent from the entity to the unmanned vehicle, and the validation process may comprise determining that the activation instruction is not valid if a time period between the indicated time and a time that the validation process is performed is longer than a pre-determined threshold.

The apparatus and the entity may each comprise multiple codes, each code being related to a payload activation event. Once completed, information pertaining to each payload activation event may be stored in the apparatus. The information may comprise valid, actioned codes. An event history may, thus, be generated and the next anticipated code may readily be identified. Time synchronisation data may be provided to and stored in each of the entity and the apparatus. Time synchronisation data may be used in combination with the event history to enable system re-synchronisation to be performed. System re-synchronisation may be required following a period of degradation in data communications between the apparatus and the entity, for example a UAV and its ground station.

The activation instruction may comprise an indication of the next anticipated valid code. The validation process may comprise comparing the received anticipated code with the corresponding code stored in the apparatus.

The method may further comprise receiving target details from a further entity, the further entity being remote from the unmanned vehicle, and, using the received target details, facilitating a payload controller to direct the payload towards the target.

The further entity may be the entity.

The method may further comprise measuring a parameter of an area of terrain, the area of terrain comprising a target, and providing, for use by the entity, the measurements of the parameter.

The step of measuring may be performed using at least one of a visible light detecting camera, an infra-red camera, a ultra-violet camera or a radar sensor.

The method may further comprise, in response to activating the payload, providing for the entity an indication that the payload has been activated.

The unmanned vehicle may be an aircraft.

The payload may be a weapon.

The method may further comprise, if in response to activating the payload the payload fails to be activated, providing for use by the entity an indication that the payload has failed to be activated.

In a further aspect, the present invention provides apparatus mounted on an unmanned vehicle and arranged to act upon a payload, the payload being mounted on the unmanned vehicle and, under an action of the apparatus, able to be activated, the apparatus being arranged to receive an activation instruction from an entity, the entity being remote from the unmanned vehicle, determine whether or not the received activation instruction is valid by performing a validation process, and, in response to determining that the received activation instruction is valid, activate the payload.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

BRIEF DESCRIPTION OF THE DRAWINGS

FIG. 1 is a schematic illustration (not to scale) of an example scenario in which an aircraft implements an embodiment of an aircraft weapon system;

FIG. 2 is a schematic illustration (not to scale) of the aircraft;

FIG. 3 is a schematic illustration (not to scale) of an embodiment of the weapon system of the aircraft; and FIG. 4 is a process flow chart showing certain steps of a process for implementing the weapons system to attack the target.

DETAILED DESCRIPTION

FIG. 1 is a schematic illustration (not to scale) of an example scenario in which an aircraft 2 implements an embodiment of an aircraft weapon system.

In this scenario, the aircraft 2 is an unmanned aircraft (UAV).

In this scenario, the aircraft 2 has been launched under the control of a ground station 4.

In this scenario, the ground station 4 is located on the ground 6.

FIG. 1 shows the aircraft 2 airborne (i.e. after its launch from the ground 6).

In this scenario, the aircraft 2 is launched under the control of the ground station 4 with an intention of attacking (using a weapon launched from the aircraft 2 as described in more detail later below) a target 8.

In this embodiment, the aircraft 2 follows a pre-programmed navigation route. The aircraft 2 does not deviate from this route unless the aircraft 2 is commanded to "loiter" by the ground station 4, the aircraft is commanded to "return" by the ground station, or the aircraft 2 experiences a communications failure (in which case the aircraft 2 returns to the ground 6).

In this scenario, the target 8 is located on the ground 6. Also, the target 8 is located at a position on the ground 6 that is remote from the ground station 4.

In this scenario, the aircraft 2 and the ground station 4 are in two-way communications. The aircraft 2 and the ground station 4 communicate via a communications satellite, hereinafter referred to as "the satellite 10". The two-way communication of the aircraft 2 and the ground station 4 is represented in FIG. 1 by dotted two-headed arrows. Also, the two-way communication of the aircraft 2 and the ground station 4 is described in more detail later below with reference to FIG. 4.

FIG. 2 is a schematic illustration (not to scale) of the aircraft 2.

In this example, the aircraft 2 comprises a transceiver 12 and a weapon system 14.

In this example, messages received by the aircraft 2 from the ground station 4 (via the satellite 10) are received by the transceiver 12. Furthermore, in this embodiment messages sent by the aircraft 2 to the ground station 4 (via the satellite 10) are sent by the transceiver 12.

In this example, the transceiver 12 is connected to the weapon system 14 such that messages received at the transceiver 12 from the ground station 4 (via the satellite 10) are sent from the transceiver 12 to the weapon system 14. Furthermore, the transceiver 12 is connected to the weapon system 14 such that messages may be sent from the weapon system 14 to the transceiver, which may then be sent from the transceiver 12 to the ground station 4 (via the satellite 10).

In this embodiment, the aircraft 2 comprises an Armament Control Safety Break (not shown in the Figures) which provides an additional safety interlock whilst the aircraft 2 is on the ground 6.

FIG. 3 is a schematic illustration (not to scale) of an embodiment of the weapon system 14 of the aircraft 2.

In this embodiment, the weapon system 14 comprises a sequencer 16 and a weapon 18.

In this embodiment, the sequencer 16 is fitted in the aircraft such that, when certain criteria are satisfied (i.e. when certain messages have been received by the aircraft 2 from the ground station 4) the sequencer 16 controls the power, pre-launch, and firing commands to the weapon 18.

The sequencer 16 is connected to the weapon 18 such that the weapon 18 can be powered and controlled by the sequencer 16.

In this embodiment, prior to the launch of the aircraft 2 (i.e. prior to the aircraft 2 taking off from the ground 6) a predetermined "firing code" is stored in the sequencer 16, e.g. by hardwiring the code into a storage device which is connected to a port on the sequencer 16. The same code is also stored in a further storage device which is kept by mission crew at the ground station 4. This firing code is used to initiate the firing of a weapon from the aircraft 2 as described in more detail later below with reference to FIG. 4.

Alternatively, the firing code could by synchronised between the ground station 4 and the sequencer 16 by transmitting the firing code via the satellite 10, whilst the aircraft 2 is on the ground.

In this example, the ground station 4 and the sequencer 16 are time synchronised using an incrementing time code, transmitted with the firing code from the ground via the satellite 10 and the transceiver 12. The firing code should comprise sufficient digits to satisfy the safety requirements of the system.

A new/different firing code is used for each new aircraft sortie.

Multiple firing codes may be stored in the sequencer 16 to enable many different events to be instructed by the ground station 4 within a single sortie. The multiple firing codes may be transmitted from the ground station 4 via the satellite 10 and transceiver and stored in the sequencer 16.

The process by which the sequencer 16 powers, controls and fires the weapon 18 is described in more detail later below with reference to FIG. 4.

In this embodiment, the weapon 18 is a relatively lightweight, precision strike, low collateral damage weapon. However, in other embodiments the weapon is a different type of weapon, or other type of payload. For example, in other embodiments, the weapon is a different type of lethal effector, such as an unpowered laser guided bomb. In other embodiments, the weapon may use any appropriate method to be guided to the target, e.g. a beam rider method, or the weapon may detect reflected laser light on the ground and steer towards that. In other embodiments the payload may be a non-lethal effector, e.g. a communications jamming device, a locator beacon, or equipment for friendly ground-based troops.

FIG. 4 is a process flow chart showing certain steps of a process for implementing the weapons system 14 to attack the target 8.

In this embodiment, the aircraft 2 is airborne following its launch from the ground 6, as described above with reference to FIG. 1.

At step s2, as the aircraft 2 flies above the ground 6, images of the ground 6 are captured by the aircraft 2 using an aircraft-mounted camera (not shown in the Figures).

At step s4, the captured images of the ground 6 are relayed from the transceiver 12 of the aircraft 2 to the ground station 4. In this embodiment, these images are sent via the satellite 10.

At step s6, the camera images received at the ground station 4 are displayed (on a screen) to a human operator at the ground station 4.

At step s8, the operator identifies the target 8 within the displayed images.

At step s10, the operator sends details about the target 8 (e.g. a global position of the target 8) from the ground station 4 to the aircraft 2.

In this embodiment, these target details are sent via the satellite 10.

At step s12, the firing code that is stored at the ground station 4 is sent from the ground station 4 to the aircraft 2 by the operator.

In this embodiment, the ground station's firing code is sent via the satellite 10.

In this embodiment, the ground station's firing code is transmitted to the aircraft 2 at the same time as the target details are transmitted to the aircraft 2 (as described above at step s10). However, in other embodiments, the firing code and the target details are sent to the aircraft 2 at different respective times.

At step s14, the ground station's firing code and the target details received at the transceiver 12 of the aircraft 2 is transmitted to the sequencer 16 of the weapon system 14.

In this embodiment the time between the ground station's firing code and target details being sent from the ground station 4, and the time these signals are received at the sequencer 16 is typically less than 10 seconds. Preferably, the time delay in this communication is less than 10 seconds, for example, less than 1 second. In other embodiments, for example, when multiple satellite links are used in the communications path, the delay is greater than 10 seconds.

At step s16, it is determined whether the firing code received by the aircraft 2 from the ground station 4 is valid.

In this embodiment, the sequencer 16 checks the validity of the ground station's firing code.

As described above, a firing code is stored in a storage device which is connected to a port on the sequencer 16. This stored firing code is compared to the firing code received by the aircraft 2 from the ground station 4 to determine the validity of the firing code received from the ground station 4.

In this embodiment, if the firing code received from the ground station 4 is identical to the firing code stored at the sequencer 16, the received code is determined to be valid.

However, if the firing code received from the ground station 4 is not identical to the firing code stored at the sequencer 16, the received code is determined to be invalid.

Also, in this embodiment the sequencer 16 is arranged to only process a valid firing code if the code carries a recent time code. In this embodiment, a valid code is rejected by the sequencer 16, i.e. declared "invalid", if it has been delayed by a pre-determined time period, for example, greater than the maximum expected communication delay. This tends to alleviate problems caused by the firing code command being kept in the aircraft data buffer for several minutes prior to it being processed by the sequencer 16. For example, the problem of the weapon 18 receiving a significantly delayed power and trigger command tends to be reduced.

In practice, it tends to be very unlikely that there is a significant delay in processing the firing code. In this embodiment, a misfire (Hang-Up) is assumed to have occurred if there is a firing delay longer than the maximum expected communication delay.

If, at step s16, it is determined by the sequencer 16 that firing code received by the aircraft 2 from the ground station 4 is valid, the process proceeds to step s18.

However, if, at step s16, it is determined by the sequencer 16 that firing code received by the aircraft 2 from the ground station 4 is not valid, the process proceeds to step s22.

At step s18, the target details transmitted to the sequencer 16 at step s14 are transmitted from the sequencer 16 to the weapon 18.

In this embodiment, the determination that the firing code is valid and the transmission of the target details from the sequencer 16 to the weapon 18 is performed in less than 30 ms.

At step s20, the weapon 18 is launched from the aircraft 2.

In this embodiment, after launch the weapon 18 is controlled in a conventional manner dependent on the type of weapon.

In this embodiment, if a weapon misfire (Hang-Up) occurs during firing, the weapon system 14 reports this via the transceiver 12 to the ground station 4. This report is sent via satellite 10.

The aircraft-mounted camera may be used to advantageously provide a visual aid for confirming if the weapon 18 has successfully fired.

After performing step s20, the process for implementing the weapons system 14 to attack the target 8 ends.

Returning now to step s16, if at this step it is determined by the sequencer 16 that firing code received by the aircraft 2 from the ground station 4 is invalid, the process proceeds to step s22.

At step s22, after an invalid code is received by the sequencer 16, the sequencer 16 ignores the firing code and target details are not provided to the weapon 18 via the sequencer 16.

At step s24 the weapon system 14 reports via the transceiver 12 to the ground station 4 that an invalid firing code has been received. This report is sent via satellite 10.

After step s24, the process for implementing the weapons system 14 ends.

Thus, a process for implementing the weapons system 14 to attack the target 8 is provided.

Once a valid action or event has been completed, the ground station 4 may send an indication of the next anticipated valid firing code to the sequencer 16 (e.g. via the satellite 10 and transceiver 12). The sequencer 16 may return a confirmation of the anticipated next valid firing code to the ground station 4.

If degradation in the communication link occurs, say, due to a temporary loss of or problem with the satellite connection, the data transmitted by the ground station to the transceiver (or by the transceiver to the ground station) may be corrupted. The ground station 4 may then request that the firing code and time synchronisation data for the last successfully completed action be transmitted by the sequencer 16 via the transceiver 12 and satellite 10 to the ground station 4, such that end-to-end re-synchronisation of the ground station 4 and the sequencer 16 can be achieved.

An advantage provided by the above described system and method is that failure modes of the system tend to be easy to identify and plan for.

The following information details certain possible failure modes of the above described system, and certain actions that may be performed in the event of those failures occurring.

A first failure mode is where the weapon 18 misfires as result of sequencer 16 not relaying codes to the weapon 18 (i.e. there is fault in the sequencer 16). The weapon system 14 reports via the transceiver 12 to the ground station 4 that a misfire has occurred. Any relevant data on this misfire may also be reported to the ground station 4. This report is sent via the satellite 10.

A second failure mode is where the weapon 18 misfires e.g. as a result of a failure of the release mechanism for releasing the weapon 18 from the aircraft 2. In other words, the weapon is initiated, but not fired. In this event, the weapon system 14 reports via the transceiver 12 to the ground station 4 that a misfire has occurred. Any relevant data on this misfire may also be reported to the ground station 4. This report is sent via the satellite 10.

A further advantage of the above described system and method is that a fully autonomous vehicle is used to launch payloads at a target. Thus, a human operator on the vehicle (i.e. a pilot) is not used, and the risks to such an operator are negated. Nevertheless, in the event of an emergency, manual control of the aircraft may be reverted to.

A further advantage of the above described system is that the aircraft can be fitted with a variety of different payloads depending on the requirements of the scenario.

A further advantage of the above described system is that the aircraft tends to be inherently stable in all three axes (roll, pitch, and yaw).

The above described system and method tends to provide for real time monitoring of the state of the weapon on the aircraft.

The satellite link between the ground station and the aircraft advantageously tends to provide for Beyond Line Of Sight (BLOS) communication. In other embodiments, a different type of data link, e.g. a Line Of Sight (LOS) data link, is used instead of or in addition to the BLOS data link.

A further advantage provided by the above described system and method is that end-to-end control of the weapon system tends to be maintained even when the data link employed (between the ground station and the aircraft) has uncertain performance, availability, and integrity.

Apparatus, for implementing the arrangement described above with reference to FIGS. 1-3, and performing the method steps described above with reference to FIG. 4, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the aircraft weapon system is implemented in the particular scenario described above with reference to FIG. 1. However, in other embodiments the aircraft weapon system is implemented in a different scenario. For example, in other embodiments a scenario in which the weapon system is implemented may comprise a different number of aircraft, ground stations, satellites, and/or targets that interact in the same or a different appropriate way to that described above.

In the above embodiments, the autonomous vehicle used to deliver the payload is an aircraft. However, in other embodiments the vehicle is a different type of autonomous vehicle, for example, an autonomous land-based or water-based vehicle.

In the above embodiments, communications between the ground station and the aircraft are via a single satellite. However, in other embodiments the ground station and the vehicle communicate in a different way, for example, via a different number of satellites, or directly, or using an airborne relay.

In the above embodiments, the aircraft follows a pre-programmed navigation route. However, in other embodiments the vehicle may follow a different type of route, for example a series of way-points may be uploaded to the aircraft while the aircraft is airborne, or the aircraft may determine its own route.

In the above embodiments, the firing code is stored in a storage device which is connected to a port on the sequencer. The same code is also stored at the ground station. The firing code may be stored in computer memory of the respective sequencer and ground station. However, in other embodiments a different appropriate system is implemented to provide relatively secure and robust way in which the sequencer (or equivalent) can validate firing codes and target details. For example, in other embodiments two respective firing codes can be relayed to the aircraft from two respective ground stations. The sequencer (or equivalent) may compare the two received codes in order to validate an attack instruction.

In the above embodiments, the ground station is located on the ground. However, in other embodiments, the ground station, i.e. a location that the operator that controls the aircraft's weapon systems is at, is located at a different location remote from the aircraft, e.g. in a different aircraft or other vehicle.

In the above embodiments, an aircraft-mounted camera is used to capture images of the ground for use by the operator at the ground station. However, in other embodiments, a different type of sensor (mounted on the aircraft or remote from the aircraft) is used to provide data to the operator for the purpose of target selection. For example, a visible light-detecting camera, an infra-red camera, a ultra-violet camera, a radar sensor, etc. may be used.

The invention claimed is:

1. A method performed by an apparatus, mounted on an unmanned vehicle and arranged to act upon a payload, the payload being mounted on the unmanned vehicle and, under an action of the apparatus, able to be activated, the method comprising:
   receiving an activation instruction from an entity, the entity being remote from the unmanned vehicle, said activation instruction comprising an indication of a time that the activation instruction was sent from the entity to the unmanned vehicle;
   determining whether or not the received activation instruction is valid by performing a validation process, said validation process comprising determining that the activation instruction is valid only when a time period between the time that the activation instruction was sent and a time that the validation process is performed is less than a pre-determined threshold; and
   in response to determining that the received activation instruction is valid, activating the payload.

2. The method according to claim 1, comprising, in response to determining that the received activation instruction is not valid, preventing or opposing the activation of the payload.

3. The method according to claim 2, wherein the apparatus include, or has access to, validation information, the validation process comprising,
   comparing the received activation instruction to the validation information.

4. The method according to claim 2, comprising:
   receiving target details from a further entity, the further entity being remote from the unmanned vehicle; and
   using the received target details, facilitating a payload controller to direct the payload towards a target.

5. The method according to claim 1, wherein:
the apparatus includes, or has access to, validation information;
the validation process comprising comparing the received activation instruction to the validation information.

6. The method according to claim 5, wherein:
the activation instruction comprises an activation code; and
the validation information is a further validation code, the further validation code being stored in the apparatus.

7. The method according to claim 1, comprising:
receiving target details from a further entity, the further entity being remote from the unmanned vehicle; and
using the received target details, facilitating a payload controller to direct the payload towards a target.

8. The method according to claim 1, comprising:
measuring a parameter of an area of terrain, the area of terrain including a target; and
providing, for use by the entity, the measurements of the parameter.

9. The method according to claim 8, wherein the step of measuring is performed using at least one of a visible light detecting camera, an infra-red camera, a ultra-violet camera or a radar sensor.

10. The method according to claim 1, comprising, in response to activating the payload, providing, for use by the entity, an indication that the payload has been activated.

11. The method according to claim 1, wherein the unmanned vehicle is an aircraft.

12. The method according to claim 1, wherein the payload is a weapon.

13. The method according to claim 1, further comprising, upon a failure of the payload to be activated, providing for use by the entity of an indication that the payload has failed to be activated.

14. The method according to claim 1, further comprising:
storing information pertaining to the payload activation, said information including the valid activation instruction and time synchronisation data, and
providing to the entity the time synchronisation data.

15. The method according to claim 14, further comprising time synchronising the apparatus and the entity using the time synchronisation data.

16. An apparatus configured for mounting on an unmanned vehicle, said apparatus being configured to act upon a payload, said payload being mounted on the unmanned vehicle said apparatus comprising:
a sequencer, wherein, under an action of the sequencer, the payload is able to be activated
a transceiver arranged to
communicate with the sequencer and
receive an activation instruction from an entity, the entity being remote from the unmanned vehicle; and
a weapons system arranged
to communicate with the sequencer,
to determine whether or not the received activation instruction is valid by performing a validation process, and
in response to determining that the received activation instruction is valid, to activate the payload;
wherein:
the activation instruction comprises an indication of a time that the activation instruction was sent from the entity to the unmanned vehicle; and
the validation process comprises determining that the activation instruction is valid only when a time period between the time that the activation instruction was sent and a time that the validation process is performed is less than a pre-determined threshold.

17. The apparatus of claim 16, in combination with:
a payload; and
an unmanned vehicle upon which the apparatus and payload are mounted.

18. The apparatus of claim 17, in combination with:
a remote entity for activating the apparatus.

19. A non-transitory storage medium readable by a computing device, said computing device being cooperative with an apparatus, mounted on an unmanned vehicle and arranged to act upon a payload, the payload being mounted on the unmanned vehicle and, under an action of the apparatus, able to be activated, said storage medium comprising code recorded thereupon that is operable on said computing device so as to cause said apparatus to execute steps including:
receiving an activation instruction from an entity, the entity being remote from the unmanned vehicle, said activation instruction comprising an indication of a time that the activation instruction was sent from the entity to the unmanned vehicle;
determining whether or not the received activation instruction is valid by performing a validation process, said validation process comprising determining that the activation instruction is valid only when a time period between the time that the activation instruction was sent and a time that the validation process is performed is less than a pre-determined threshold; and
in response to determining that the received activation instruction is valid, activating the payload.

20. A computing device cooperative with an apparatus mounted on an unmanned vehicle and arranged to act upon a payload, the payload being mounted on the unmanned vehicle and, under an action of the apparatus, able to be activated, said computing device comprising a non-transitory, machine readable storage medium containing code recorded thereupon that is operable on said computing device so as to cause said apparatus to execute steps including:
receiving an activation instruction from an entity, the entity being remote from the unmanned vehicle, said activation instruction comprising an indication of a time that the activation instruction was sent from the entity to the unmanned vehicle;
determining whether or not the received activation instruction is valid by performing a validation process, said validation process comprising determining that the activation instruction is valid only when a time period between the time that the activation instruction was sent and a time that the validation process is performed is less than a pre-determined threshold; and
in response to determining that the received activation instruction is valid, activating the payload.

21. A method performed by an apparatus, mounted on an unmanned vehicle and arranged to act upon a payload, the payload being mounted on the unmanned vehicle and, under an action of the apparatus, being able to be activated, the method comprising:
receiving an activation instruction from an entity, the entity being remote from the unmanned vehicle;
determining whether or not the received activation instruction is valid by performing a validation process; and
in response to determining that the received activation instruction is valid, activating the payload;
wherein:
the apparatus includes, or has access to, validation information;

the validation process comprises comparing the received activation instruction to the validation information;
the activation instruction comprises an activation code; and
the validation information is a validation code, the validation code being stored in the apparatus.

* * * * *